(12) United States Patent
Massengale (10) Patent No.: US 10,687,461 B1
(45) Date of Patent: Jun. 23, 2020

(54) BROADCAST SPREADER ASSEMBLY FOR GRANULAR MATERIAL

(71) Applicant: Byron Massengale, Greer, SC (US)

(72) Inventor: Byron Massengale, Greer, SC (US)

( * ) Notice: Subject to any disclaimer, the term of this patent is extended or adjusted under 35 U.S.C. 154(b) by 42 days.

(21) Appl. No.: 16/225,325

(22) Filed: Dec. 19, 2018

(51) Int. Cl.
*A01C 17/00* (2006.01)
*A01C 15/00* (2006.01)

(52) U.S. Cl.
CPC .......... *A01C 17/005* (2013.01); *A01C 15/006* (2013.01); *A01C 17/006* (2013.01)

(58) Field of Classification Search
CPC ... A01C 15/006; A01C 17/005; A01C 17/006; A01M 9/0069; A01M 9/0092; A01M 99/00
USPC ................... 239/650, 661, 670, 689, DIG. 6; 222/282, 305, 306, 367–369
See application file for complete search history.

(56) References Cited

U.S. PATENT DOCUMENTS

| | | | | |
|---|---|---|---|---|
| 2,573,784 A | * | 11/1951 | Asbury | A01C 17/00 |
| | | | | 406/98 |
| 2,672,361 A | * | 3/1954 | Werbe | B60B 39/086 |
| | | | | 291/3 |
| 2,793,791 A | | 8/1954 | Clark | |
| 3,738,546 A | | 6/1973 | Speicher | |
| 4,134,349 A | * | 1/1979 | Marks | A01M 9/0069 |
| | | | | 111/95 |
| 4,153,184 A | * | 5/1979 | Parish | A01C 15/02 |
| | | | | 222/175 |
| 4,316,559 A | * | 2/1982 | McLemore | G01F 11/24 |
| | | | | 222/225 |
| 4,316,625 A | * | 2/1982 | Goon | B62D 37/00 |
| | | | | 222/368 |
| 4,588,133 A | | 5/1986 | Brabb et al. | |
| 5,189,965 A | * | 3/1993 | Hobbs | A01C 15/04 |
| | | | | 111/174 |
| 5,820,035 A | | 10/1998 | Johnson et al. | |
| 5,823,401 A | * | 10/1998 | Zgoda | G01F 11/22 |
| | | | | 222/333 |
| 6,047,909 A | | 4/2000 | Simpson | |
| 6,766,924 B1 | * | 7/2004 | Ophardt | G01F 11/24 |
| | | | | 222/368 |
| 6,907,832 B2 | | 6/2005 | Wyne | |
| 7,086,616 B2 | * | 8/2006 | Murphy | A01C 15/04 |
| | | | | 239/654 |

(Continued)

*Primary Examiner* — Darren W Gorman
(74) *Attorney, Agent, or Firm* — Southeast IP Group LLC; Thomas L. Moses (57) ABSTRACT

A broadcast spreader assembly for spreading granular material over a yard, field, or the like includes a hopper for holding granular material, a motor for driving a rotating drive shaft having a distribution chamber in a side of the rotating drive shaft, and a spreader mechanism. The rotating distribution chamber delivers a constant dosage of granular material to the spreader mechanism with each rotation thereof. The broadcast spreader may be remotely controlled by software on a smart phone, tablet or other computing device, and the rotational speed of the drive shaft and distribution chamber may vary in accordance with the ground speed of the broadcast spreader, in order to administer the proper dosage of granular material to a specific area or acreage of land. The broadcast spreader assembly is attachable to a spreader mechanism, such as a lawnmower or blower, or the like.

16 Claims, 5 Drawing Sheets

(56) References Cited

U.S. PATENT DOCUMENTS

| | | | |
|---|---|---|---|
| 8,387,205 B2* | 3/2013 | Weihl | A01D 42/06 15/347 |
| 8,893,654 B2 | 11/2014 | Wisecarver | |
| 2003/0061756 A1* | 4/2003 | Lokey | A01M 1/2011 43/42.06 |
| 2007/0194155 A1 | 8/2007 | Kendall | |

* cited by examiner

BROADCAST SPREADER ASSEMBLY FOR GRANULAR MATERIAL

FIELD OF THE INVENTION

The present invention relates to devices and assemblies that are used to broadcast or spread different types of granulated materials evenly over a large surface, such as a yard, meadow or field. More specifically, the present invention includes an assembly that administers proper dosages of granulated (or "granular") material, such as fertilizer, insecticides, seeds, or the like, onto the ground so that it is generally evenly distributed.

BACKGROUND OF THE INVENTION

There are many types of granulated materials that are spread over land to serve different purposes. For instance, granulated fire ant killer may be distributed across a person's lawn, in order to kill fire ants, and prevent them from returning or establishing future ant colonies on the property, and granulated fertilizers are spread out to help grass grow. Various types of machinery have been developed over the years, to evenly distribute the granular material over fields, yards, and other types of property parcels.

One issue that is prevalent among many of these broadcast spreaders is that they do not spread the proper dosage of granular material over the land, in accordance with the instructions for the different granular materials. In some cases, the granule sizes vary widely within an individual package, which causes distribution problems with some of these spreaders, because if the opening on the spreader is wide enough to allow the largest particles to pass through, much more of the smaller particulate passes through the opening than is necessary or called for in the instructions.

Examples of such assemblies that have been developed for this purpose are set forth below, and each of the following references are hereby incorporated herein by reference:

U.S. Pat. No. 3,738,546 Metering Device for Securement to the Hopper or Container of a Distributor of Seeds and Other Fluent Material A device which can be secured to the hopper or container of a seed or other fluent material distributor and which serves to regulate the amount of seed or other material which passes from the container to the spreader or broadcaster of the distributor. The metering device includes a mounting plate which is securable to the bottom wall of the fluent material container and which has a discharge opening formed therein. A shiftable door plate is carried by the mounting plate and can be made to selectively cover a portion of the discharge opening in the mounting plate and thus regulate the effective area of the discharge opening.

U.S. Pat. No. 4,588,133 Combined Chute and Variable Rate Control Assembly for a Broadcast Spreader Improved control over the distribution pattern and the amount of fertilizer, grass seed or the like dispensed by a broadcast spreader is accomplished by mounting a variable rate control device in a material directing chute secured below a basin wall of a hopper. A web or ramp portion of the chute is spaced below a discharge port in the hopper, and the rate control device is rotatably mounted in a housing formed in the rear of the chute to engage a shutter that is slidably mounted under the discharge port.

U.S. Pat. No. 5,820,035 Broadcast Spreader Mechanism

An improved feed distribution and closure mechanism for use with broadcast spreaders for spreading granular or powdery material or both is described. The mechanism comprises a threaded shaft, a disk mounted on the shaft having a central opening provided with internal threads mating with the shaft, a return spring, and a collar or the like on the shaft to stop travel of the disk on the shaft. Materials which may be spread using spreaders equipped with the mechanism include, without limitation, sand and/or salt on roads; materials such as herbicides, pesticides, fertilizer, lime and seeds such as grass seed on fields, lawns, golf courses and the like; and most particularly, feed for both domesticated and game animals and birds.

U.S. Pat. No. 6,047,909 Hopper Discharge and Pattern Controlling Apparatus for a Broadcast Spreader A choke plate or damper is removably mounted in the bottom of the broadcast spreader hopper. The choke plate is formed with three apertures, each of which is surrounded by a boss which, with the choke plate in an operative position, projects through a material discharge outlet in the hopper bottom for sliding engagement with a shutter plate slidably mounted on a rear underside portion of the hopper. A deflector is slidably mounted on a forward underside portion of the hopper and is formed with a rearwardly projecting and downwardly inclined portion that, as the deflector is adjusted, moves between positions of greater and lesser interposition between the hopper outlet and a rotary impeller disposed therebelow.

U.S. Pat. No. 6,907,832 Granular Material Spreader Attachment for Mower or Other Apparatus A granular material spreader for a mower other a apparatus including a support column, having a support plate attached to its bottom, for supporting the spreader thereon, the spreader being mounted to the shaft of the motor which when energized turns the spreader for usage. A bracket attaching to the support column supports the hopper, for holding granular material, the bottom of the hopper including a series of apertures, and a control plate, to regulate the dispensing and spreading of granular material. A pivot lever energized to a solenoid initiates the dispensing, or containment, of spreading of granular material. The control plate includes an adjustment further regulating the amount of granular material dispensed from the hopper.

U.S. Pat. No. 8,893,654 Rotary Feed Dispensing Apparatus

A rotary feed dispensing apparatus includes a reservoir configured to hold feed. The apparatus includes a rotary dispenser having an inlet operatively coupled to the reservoir and a rotary dispenser outlet, the rotary dispenser defining a rotary dispenser interior area configured to selectively receive the feed from the reservoir through the rotary housing inlet. An impellor assembly is rotatably mounted in the rotary dispenser, the impellor assembly having an impellor body portion and at least one impellor end portion pivotally coupled to the impellor body portion. The impellor end portion is movable between an extended configuration and a folded configuration. A motor is operatively coupled to the impellor assembly and configured to rotate the impellor assembly when energized. The impellor end portion is configured to eject the feed from the rotary dispenser through the outlet when the motor is energized and the impellor end portion is at the extended configuration.

U.S. Application No. 20070194155 Broadcast Spreader with Rate Control System

A rate control system for a material spreader for maintaining a uniform dispersal or spreading of material such as fertilizer or similar material. The rate control system works with a spreader having a moveable control gate positioned at the hopper output orifice. The control system moves the spreader control gate between a closed position and an adjustably open position. The degree that the control gate is opened is controlled by a linear actuator that operates in one direction to contact a first limit switch, defining the closed position, and operates in the other direction to contact a second limit switch, with the point at which the second limit switch is contacted being adjustable.

Each of the above-referenced devices and assemblies has disadvantages, one of which is that it has been difficult to provide a spreader that can administer the proper dosage of granular material to a particular area of land. Additionally, because these dosages vary widely among different types of materials, it would be advantageous for a user to be able to adjust the dosage and rate of distribution for these granular materials, in accordance with the specific instructions for each type of granulated material. Further, it would be desirable to for a user to be able to make the dosage rate adjustments via computer software or an "app" on a mobile device, such as a smart phone, tablet, or the like.

SUMMARY OF THE INVENTION

In accordance with one aspect of the present invention, a first embodiment of a broadcast spreader assembly includes a housing, a motor disposed within the housing, and a rotating drive shaft having a distribution chamber on one side of the drive shaft for receiving granular material. A hopper or container is attached to the housing, preferably in a removable manner, and is used to hold the granulated material to be distributed. The hopper may also include a valve on a bottom portion thereof, wherein the valve may be placed into an open position, which allows the granular material to flow out of the hopper, and a closed position, which prevents the granulated material from flowing out of the hopper.

The distribution chamber is positioned to receive granular material from the hopper, and the distribution chamber has a finite volume. In use, the drive shaft spins, and the distribution chamber spins along with the drive shaft. When the distribution chamber is in alignment with the hopper (so that the distribution chamber is facing upwardly), the granulated material falls into the distribution chamber until it is full. As the drive shaft rotates, the volume of granular material rotates with the drive shaft, within the distribution chamber. When the distribution chamber is rotated so that it is facing downwardly, then the granulated material falls out of the distribution chamber and is then spread by a spreading mechanism that broadcasts the granulated material onto the ground in a generally evenly distributed manner.

The spreader mechanism may take many forms, as shown in the references above that are incorporated herein by reference. In one embodiment, the spreader mechanism is a spinning lawnmower blade, wherein the granulated materials are released above the spinning blade so that the blade is used to broadcast the granular material. However, other spreader mechanisms may be used, including other spinning mechanisms with baffles, blown air, or any other suitable spreading means, as shown in the references incorporated herein, inter alia.

The present broadcast spreader, in one embodiment, may be an attachment that can be secured to a lawnmower, tractor or ATV. In another embodiment, the broadcast spreader may be a hand-held unit that a person can carry to effect distribution of the granular material. In yet another embodiment, the spreader broadcaster may be affixed to the hose of an air-blower.

In one embodiment, the broadcast spreader may have manual controls that control the speed of rotation of the drive shaft, and may further control the rotational speed (or air speed, as the case may be) of the spreader mechanism. Alternatively, the broadcast spreader may be controlled remotely by software on a computing device, such as a smart phone, a tablet, a computer, or the like.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
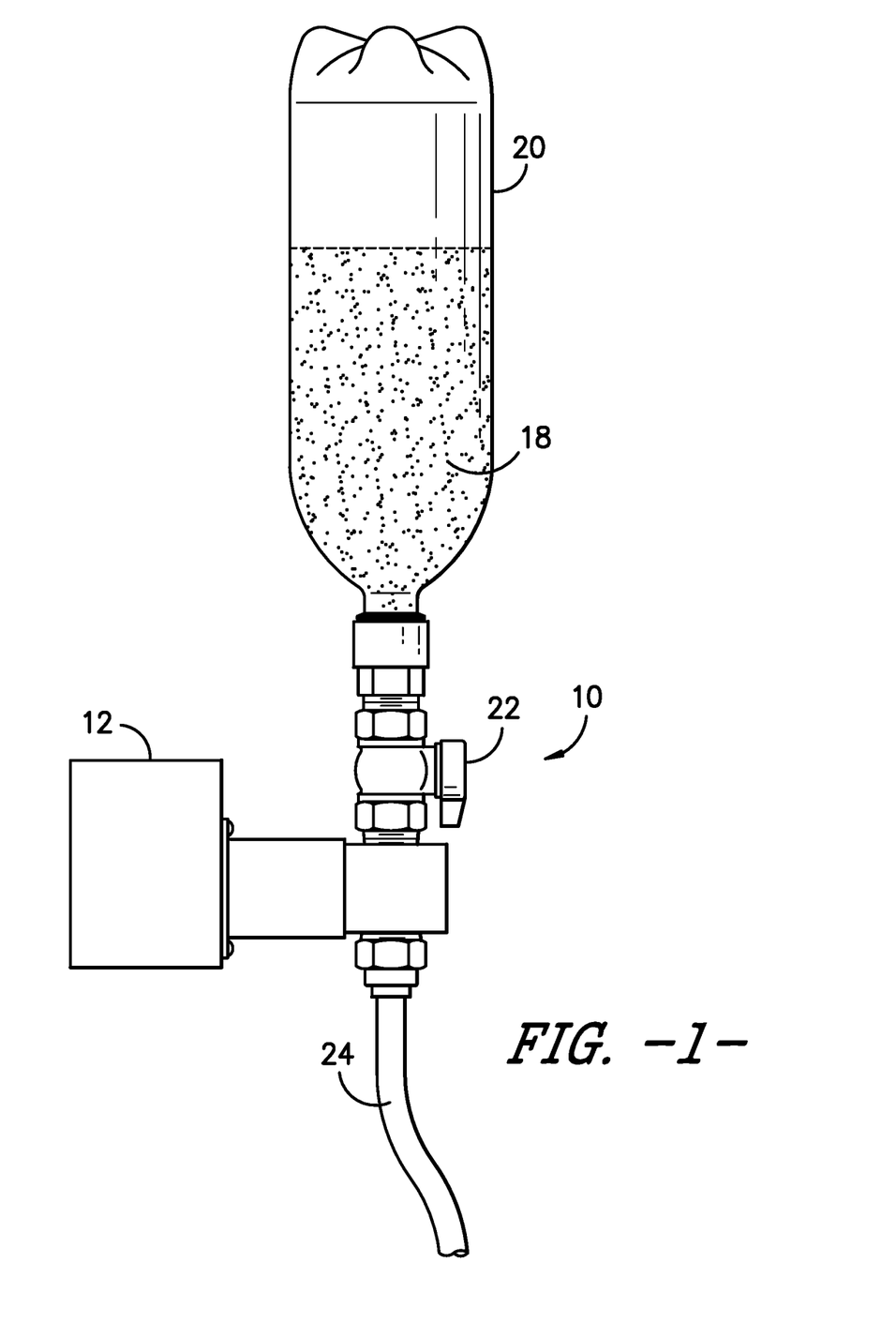
FIG. 1 is a side view of one embodiment of a broadcast spreader assembly, illustrating a hopper for containing granular material, a valve positioned below the hopper, a motor, and a tube or hose for receiving granular material.
Figure 2:
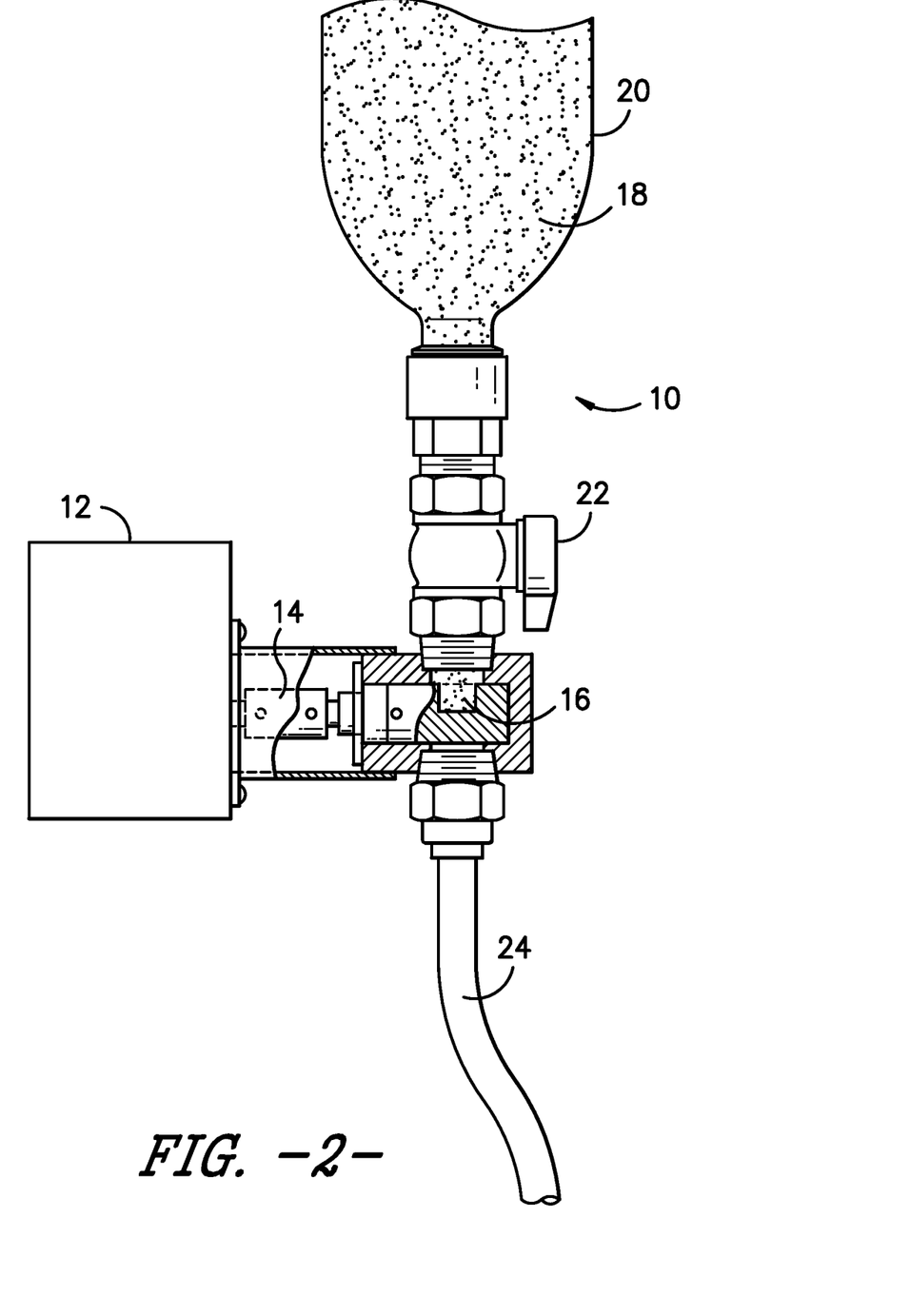
FIG. 2 is a side cutaway view, showing the embodiment of the broadcast spreader assembly set forth in FIG. 1, further showing the drive shaft and the distribution chamber below the valve and above the hose, wherein the distribution chamber is oriented upwardly to receive the granular material from the hopper.
Figure 3:
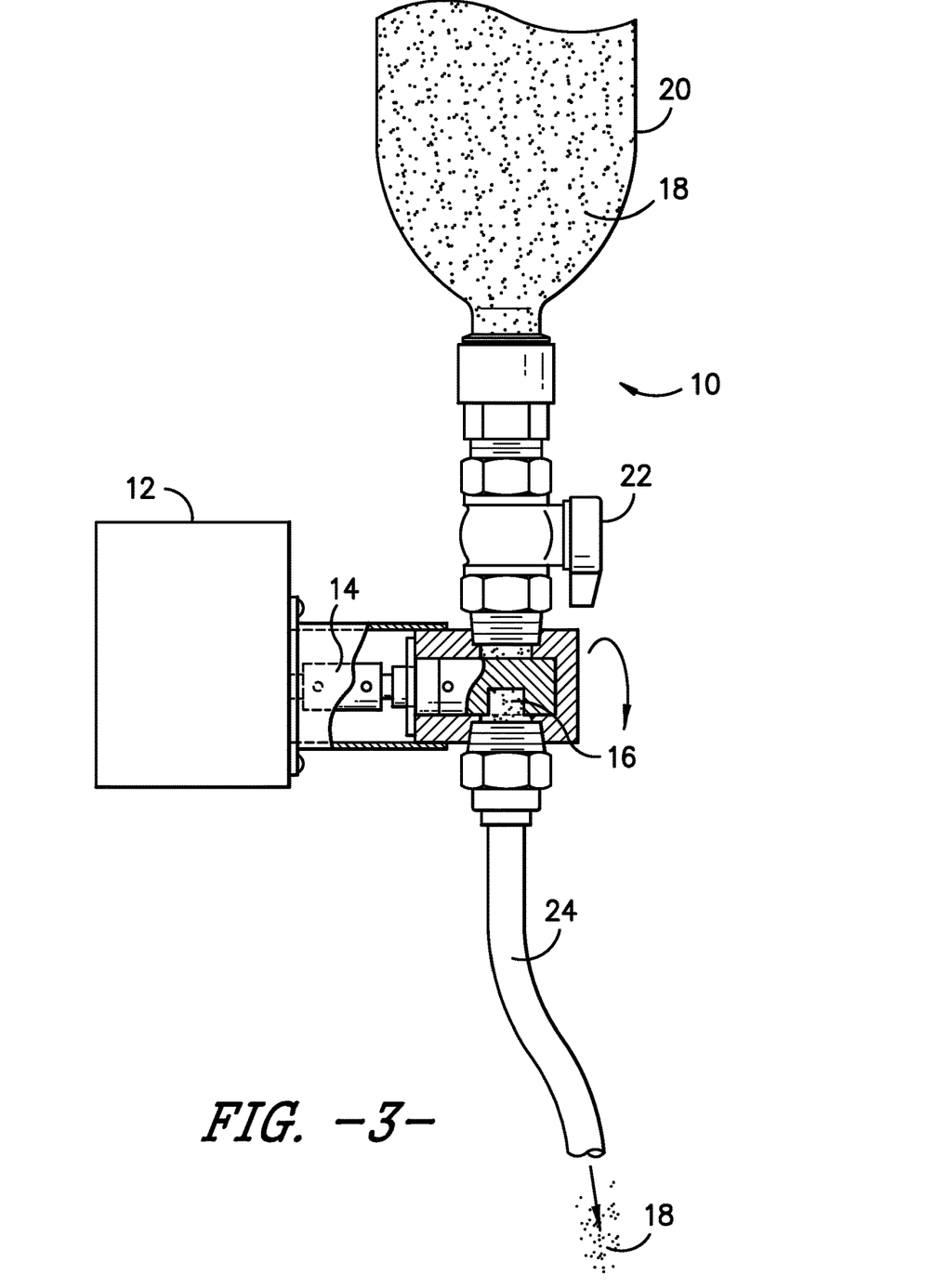
FIG. 3 is a side cutaway view, showing the embodiment of the broadcast spreader assembly set forth in FIG. 1, further showing the drive shaft and the distribution chamber below the valve and above the hose, wherein the distribution chamber is oriented downwardly for gravity feeding the granular material to the hose.

The present invention, in a first embodiment, is a broadcast spreader assembly 10 having a motor 12 (preferably an electric, battery powered motor), and a rotating drive shaft 14 that is driven by the motor 12. The drive shaft 14 is preferably a cylindrical shaped shaft, and includes an opening on one side thereof that is a distribution chamber 16 for receiving granular material 18. A hopper 20 or container is in operable communication with the drive shaft 14 and distribution chamber 16, so that the hopper 20 holds granular material 18 and feeds that material to the rotating distribution chamber 16 on each revolution of the drive shaft 14. The hopper 20 may be in the form of a bottle that contains a specific amount of granular material 18 for a specified area, such as an acre, or may be formed into any suitable container to feed granular material to the distribution chamber 16. Additionally, the hopper 20 may include a valve 22 on a bottom portion thereof, so that the valve 22 may be in an open position to allow the granular material 18 to flow out, or the valve 22 may be in the closed position, thereby preventing the flow of granular material 18 out of the hopper 20. When the distribution chamber 16 is facing upwardly, as shown in FIG. 2, the granular material 18 is gravity-fed from the hopper 20 into the distribution chamber 16 until it is full. As the drive shaft 14 rotates, when the distribution chamber 16 is facing downwardly (as shown in FIG. 3), the granular material 18 falls out of the distribution chamber 16 and into a spreader mechanism 26. Optionally, a hose 24 or other conduit may be disposed between the distribution chamber 16 and the spreader mechanism 26. As the drive shaft 14 and the distribution chamber 16 continue to rotate, upon each rotation, the distribution chamber 16 releases a specific volume of granulated material 18 to be fed (preferably gravity-fed) to the spreader mechanism 26. The doses of the granular material 18 delivered to the spreader mechanism 26 may be varied by varying either the volume of the distribution chamber 16 or the rotational speed of the drive shaft 14, or both.

Figure 4:
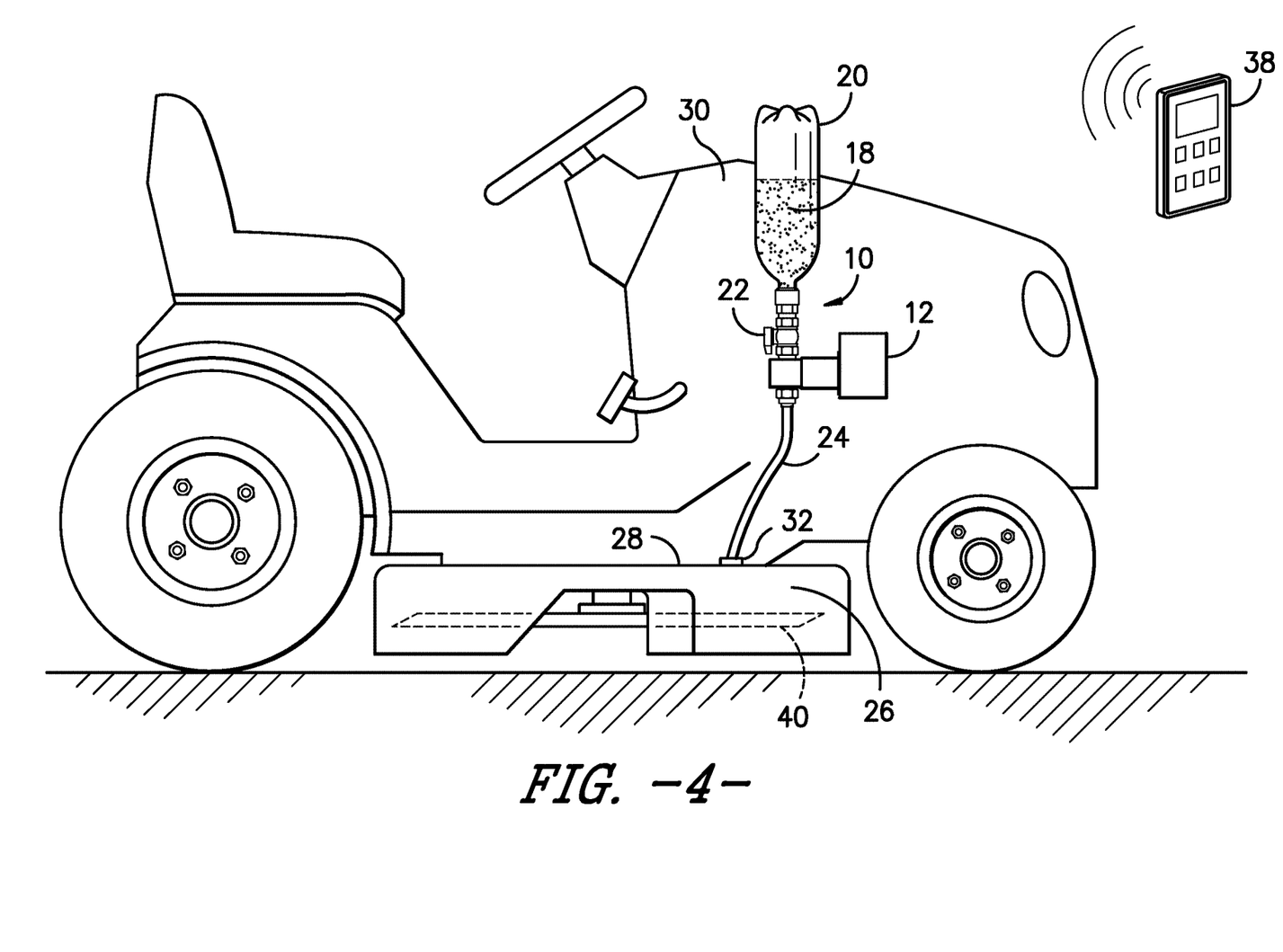
FIG. 4 is a side view of a lawnmower having one embodiment of a broadcast spreader assembly attached thereto, wherein the hose that receives the granular material is attached to a fitting on the deck of the lawnmower so that the granular material passes through the hose and through the opening in the deck and is distributed about an area of the ground by the rotation of the lawnmower blades.

The spreader mechanism 26 may vary in form, and may include any suitable assembly for that purpose. In one embodiment, the hose 24 that extends from the distribution chamber 16 and receives the dosages of granular material 18 may feed through a hole in the deck 28 of a lawnmower 30, so that the spinning lawnmower blade 40 acts as the spreader mechanism 26, as shown in FIG. 4. In this embodiment, the deck 28 of the lawnmower 30 preferably includes an opening and a fitting 32, so that the hose 24 can be attached to the fitting 32, and the granulated material 18 may pass from the distribution chamber 16, through the hose 24, and then through the opening in the deck 28 of the mower 30, so that the spinning blades 40 of the mower 30 distribute the granular material 18.

Figure 5:
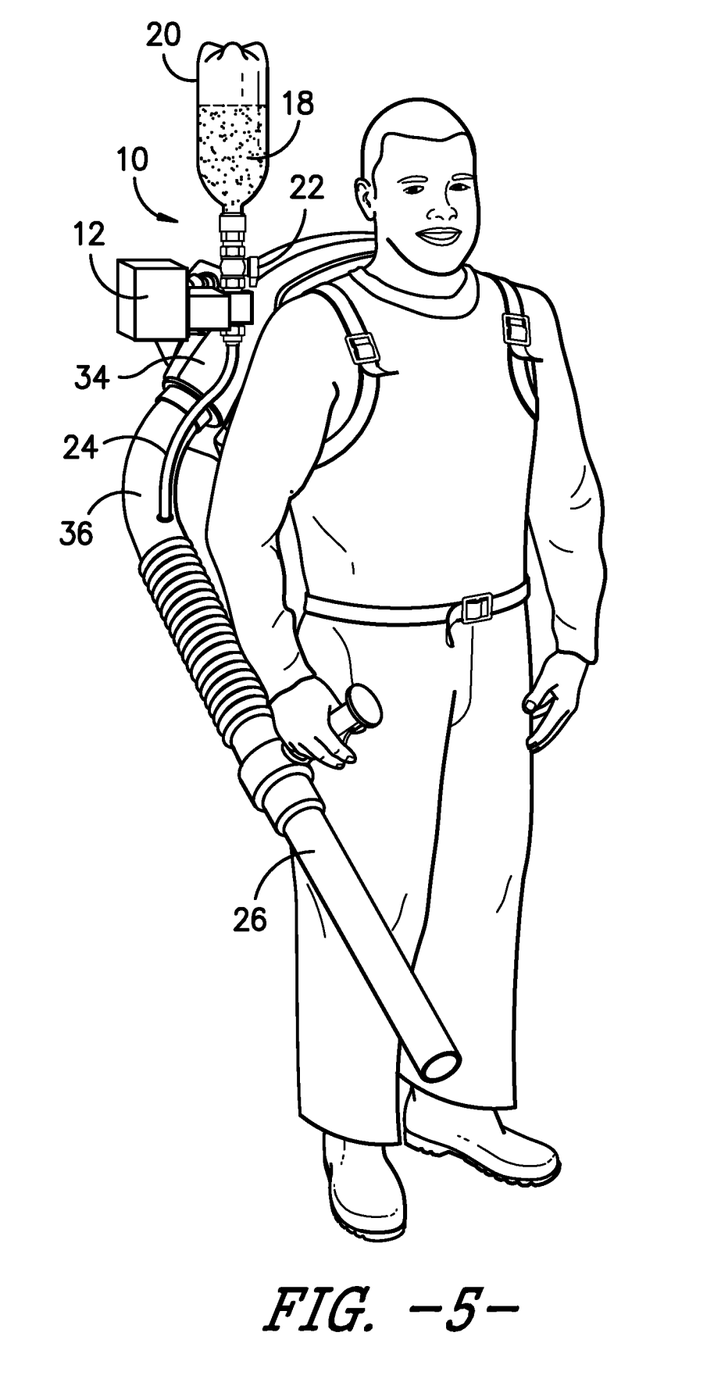
FIG. 5 is a perspective view of one embodiment of a broadcast spreader assembly attached to a backpack blower, wherein the hose that receives the granular material is attached to an opening in the air hose, so that the granular material passes through the hose and into the air hose, where the stream of air flowing therethrough is used to distribute the granular material to a ground area.

In another embodiment, an air blower 34 may be used as the spreader mechanism 26, as shown in FIG. 5. In this embodiment, the granulated material 18 passes from the hopper 20, into the rotating distribution chamber 16, and then through a hose 24 that extends to an opening in the air hose 36 of the blower 34. In this way, the dosages of granular material 18 fall into the airstream of the blower 34, and are spread and distributed thereby. Other suitable spreader mechanisms 26 may be used, including spinning discs with baffles, or the like.

In a preferred embodiment, a user may set or control the rotational speed of the drive shaft 14, as desired or necessary. A faster rotation of the drive shaft 14 delivers more granular material 18 to the spreader mechanism 26, and conversely, a slower rotation of the drive shaft 14 delivers less granular material to the spreader mechanism 26. Similarly, the speed of the spreader mechanism 26 may be increased or decreased as desired or necessary. In the case of a mower 30 as the spreader mechanism 26, the rotational speed of the blade 40 may be adjusted, either increased or decreased, as desired. In the case of the blower 34 as the spreading mechanism 26, the airspeed of the air stream may be similarly adjusted, either increased or decreased, as desired.

In one embodiment the volume of the distribution chamber 16 may be adjusted, so that the volume may increase or decrease as desired. One way to vary the volume of the distribution chamber 16 is to provide a threaded surface on the inner wall surface of the chamber 16, and provide a floor member having a threaded portion around its outer perimeter, so that when the floor is rotated in one direction within the chamber 16, it drives deeper into the chamber 16, and thereby increases the volume of the chamber 16.

Rotating the floor member in the other direction decreases the volume of the distribution chamber 16 by raising the floor. To facilitate the rotation of the floor member, a cross-slot may be provided on an upper surface of the floor member, so that a user may use a philips head screwdriver or drill bit to engage the cross-slot for rotation thereof. Other assemblies and methods may be used to vary the volume of the distribution chamber 16, as well, and such methods are known in the art.

The broadcast spreader 10 may include attachment means, such as clamps, snap-fit mechanisms, or any other suitable attachment means, so that it may be removably mounted to a lawn mower, a blower, an ATV, tractor, or any other vehicle or spreading mechanism. Such attachment means are well-known in the art, and need not be exhaustively listed here.

In one particularly useful embodiment, the broadcast spreader assembly 10 may include a transmitter/receiver and a computing device, so that the assembly may be remotely controlled by software, such as an "app" on a smart phone 38, a tablet, a computer, or the like. For example, a user may use the app on her smart phone 38 to control or determine the rate of rotation of the drive shaft 14, based on the amount of granular material 18 to be optimally distributed per square foot. The app may also incorporate GPS information to map the distribution of the material in real time, and to adjust the delivery rate of the granular material 18 based on the ground speed of the broadcast spreader assembly 10. For example, if the broadcast spreader assembly 10 is traveling at a first speed, then the rotation of the drive shaft 14 and distribution chamber rotates 16 at a specific speed, based on the amount of granulated material 18 to be spread over a defined area. If the broadcast spreader assembly 10 increases its ground speed, then the drive shaft 14 and distribution chamber 16 also increase their rotational speed, accordingly, in order to provide the proper distribution of granular material 18 over the ground. The parameters of granulated material 18 to be spread on a square footage basis may be set within the app, so that the software may control the rotational speed of the drive shaft 14 and distribution chamber 16 based on the ground speed of the broadcast spreader assembly.

Additionally, the app may include a menu of various granulated materials 18 that may be ordered, and a user may order and purchase the granulated material 18 of her choice through the app. Upon receipt of the granulated material 18, a user may load the material 18 into the hopper 20, and select the specific granulated material 18 in the app, and then select an icon for "distribute now" or similar command. This action sends instructions wirelessly from the remote control device 38 to the broadcast spreader assembly 10, including the volume of granular material 18 per area information, so that the broadcast spreader 10 automatically rotates the drive shaft 14 and distribution chamber 16 at proper revolutions per minute, based on the ground speed of the broadcast spreader 10, as measured by the GPS feature on the remote control 38. In this way, the user need not enter information such as volume of granular material 18 per square foot, as that information is simply transmitted automatically to the broadcast spreader assembly 10, and the speed of rotation of the drive shaft 14 and distribution chamber 16 is automated, accordingly. The app may incorporate the location services and GPS functions of the user's smart phone or tablet in order to control the rotational speed of the drive shaft 14, so that the distribution of the granular material 16 is properly and automatically conducted. Alternatively, the broadcast spreader assembly 10 itself may include electronics necessary to carry out these instructions, rather than relying on information being transmitted from a user's smart phone 38 or tablet.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A broadcast spreader assembly for spreading granular material over ground area, said spreader assembly comprising:
   a hopper for containing said granular material, said hopper including an opening for allowing said granular material to flow therethrough;
   a motor and a rotatable drive shaft, said drive shaft including a distribution chamber on one side thereof, wherein said distribution chamber receives said granular material from said hopper; and
   a spreader mechanism for receiving said granular material from said distribution chamber, wherein said spreader mechanism distributes said granular material to a ground surface,
      wherein said hopper includes a valve that may be in either an open position for allowing said granular material to flow toward said distribution chamber, or in a closed position, thereby preventing granular material from flowing out of said hopper.

2. The broadcast spreader assembly set forth in claim 1, wherein said distribution chamber may be adjusted to receive a greater or lesser volume of granular material.

3. The broadcast spreader assembly set forth in claim 1, further including a speed controller for controlling rotational speed of said drive shaft and said distribution chamber.

4. The broadcast spreader assembly set forth in claim 1, further including a hose for receiving granular material from said distribution chamber and delivering said granular material to said spreader mechanism.

5. The broadcast spreader assembly set forth in claim 1, wherein said spreader mechanism is selected from the group consisting of a lawnmower deck and blade and an air blower.

6. The broadcast spreader assembly set forth in claim 1, further including attachment fittings for attaching said broadcast spreader assembly to a vehicle selected from the group consisting of a lawnmower, a tractor, and an all-terrain vehicle.

7. The broadcast spreader assembly set forth in claim 1, further including a transmitter and receiver for receiving control instructions from a remote control device, wherein the remote control device is selected from the group consisting of a smart phone, a tablet, and a computing device.

8. The broadcast spreader assembly set forth in claim 7, wherein said remote control device is used to control rotational speed of said drive shaft and distribution chamber.

9. The broadcast spreader assembly set forth in claim 3, wherein said rotational speed of said drive shaft and distribution chamber automatically varies in accordance with a ground speed of said broadcast spreader assembly.

10. A broadcast spreader assembly for spreading granular material over ground area, said spreader assembly comprising:
    a hopper for containing said granular material, said hopper including an opening for allowing said granular material to flow therethrough;
    a motor and a rotatable drive shaft, said drive shaft including a distribution chamber on one side thereof, wherein said distribution chamber receives said granular material from said hopper; and
    a hose for receiving said granular material from said distribution chamber and delivering said granular material through an opening in an upper portion of a lawnmower deck,
       wherein said hopper includes a valve that may be in either an open position for allowing said granular material to flow toward said distribution chamber, or in a closed position, thereby preventing granular material from flowing out of said hopper.

11. The broadcast spreader assembly set forth in claim 10, further including a fitting on an end of said hose for removable attachment to a fitting on said upper portion of said lawnmower deck.

12. The broadcast spreader assembly set forth in claim 10, further including an attachment mechanism for attaching said broadcast spreader assembly to a lawnmower.

13. The broadcast spreader assembly set forth in claim 10, further including a speed controller for controlling rotational speed of said drive shaft and said distribution chamber.

14. The broadcast spreader assembly set forth in claim 10, further including a transmitter and receiver for receiving control instructions from a remote control device, wherein the remote control device is selected from the group consisting of a smart phone, a tablet, and a computing device.

15. The broadcast spreader assembly set forth in claim 14, wherein said remote control device is used to control rotational speed of said drive shaft and distribution chamber.

16. The broadcast spreader assembly set forth in claim 15, wherein said rotational speed of said drive shaft and distribution chamber automatically varies in accordance with a ground speed of said broadcast spreader assembly.

* * * * *